Patented July 16, 1935

2,008,489

UNITED STATES PATENT OFFICE 2,008,489

STABLE GAS-GENERATING COMPOSITIONS

Wilfred Rodney Cousins, Northwich, England, assignor to Imperial Chemical Industries Limited, a corporation of Great Britain No Drawing. Application January 12, 1933, Serial No. 651,450. In Great Britain February 24, 1932

10 Claims. (Cl. 23—250)

This invention relates to gas-producing compositions, more particularly compositions which evolve gas when heated, and a process for the manufacture thereof.

The use of chemical substances or mixtures of chemical substances which evolve gas under the action of heat, for the purpose of inflating rubber balls and the like, is already known. Among the substances which have been proposed for use in this connection are mixtures of ammonium chloride and alkali metal nitrites, tartaric acid and sodium bicarbonate or ammonium carbonate. These materials are usually made up into pellets of size according to the quantity of gas required to be evolved.

A very serious disadvantage in practice of such mixed pellets, typified by ammonium chloride-sodium nitrite mixtures, is that they are unstable and react prematurely even at ordinary temperatures. Once prepared, the pellets cannot be kept for any length of time without decomposition, which may set in almost immediately and which proceeds rapidly unless the initial materials have been specially and completely dried and the pellets kept in a moisture-excluded atmosphere, conditions which involve some difficulty and expense.

It is an object of the present invention to prepare new and improved gas-producing compositions. A further object is the production of gas-producing compositions which do not suffer from the foregoing defects and which are characterized by their much greater stability, storability and uniformity. Another object is the provision of a new and improved process for stabilizing gas-producing compositions of the character described. Other objects will appear hereinafter.

These objects are accomplished according to the present invention whereby improved compositions of the type described are prepared by incorporating in the pellet or gas-producing mixture a small proportion of a stabilizer comprising a dehydrating agent which is inert in that it does not appreciably influence the quantity of gas evolved from the main constituents of the pellet or mixture on heating.

While the invention is susceptible to considerable variation and modification in the manner of its practical application, particularly as regards the nature and proportions of materials and the exact method of procedure, the following example will illustrate the type of product falling within the invention.

*Example*

Pellets were prepared from a mixture of the following ingredients:

| | Per cent |
|---|---|
| Ammonium chloride | 40.0 |
| Sodium nitrite | 59.0 |
| Anhydrous sodium carbonate | 1.0 |

The main constituents, viz., the ammonium chloride and the sodium nitrite, were commercial materials which were not completely dried. When maintained at 60° C., this gas-producing mixture decomposed roughly 25 to 30 times more slowly than pellets prepared from dried materials but without sodium carbonate, and over 100 times more slowly than pellets prepared from undried commercial materials, again without sodium carbonate.

The invention is generally applicable in the preparation of gas-producing compositions of the type described, including not only compositions in which the gas-producing constituents are ammonium chloride and alkali metal nitrites (e. g., sodium nitrite and potassium nitrite) but also compositions of tartaric acid and sodium bicarbonate, tartaric acid and ammonium carbonate, and mixtures of other solid substances capable of evolving gas when heated, such as are well known in the art.

As the stabilizer it is preferable to employ an anhydrous substance capable of forming a hydrate which is stable at any temperature at which the pellet or mixture is required to remain without decomposition. Good results have been obtained in the use of anhydrous sodium carbonate and anhydrous sodium sulfate. A lower hydrate, which has a strong tendency to form a higher hydrate which is stable under the conditions at which the pellet or mixture is required to remain without decomposition, may be used. The use of deliquescent substances within the scope of the invention should be avoided if the compositions are likely to be exposed to the atmosphere for any considerable time; they could, however, be employed as stabilizers if the compositions are to be kept in closed containers. Thus, calcium chloride may be used as a stabilizer for compositions to be stored in closed containers but not if the compositions are to be exposed to air, especially moist air. The lower hydrate of CaCl₂ is an example of a substance which has a strong tendency to form a higher hydrate; here again, of course, the resulting composition should be stored in closed containers.

The proportions of stabilizing material may vary widely, depending upon such factors as the active gas-producing ingredients of the mixture and the conditions of use. Good results have been obtained with compositions containing about 0.5% to about 5.0% of stabilizer, and preferably about 1.0% to about 2.0%. Especially advantageous results have been obtained in the production of ammonium chloride-sodium nitrite pellets or mixtures stabilized with anhydrous sodium carbonate or anhydrous sodium sulfate or mixtures thereof.

The compositions in pellet form may be prepared in any suitable manner, e. g., in a Stokes or similar pelleting machine.

The pellets or mixtures prepared according to this invention may be employed for inflation in any known or appropriate manner, e. g., the quantity to obtain the required pressure is introduced into a rubber ball at an appropriate stage in its manufacture and inflation is effected at a later stage, suitably during the vulcanization stage.

As indicated by the example, the compositions prepared in accordance with the invention are very much more stable than similar compositions prepared and maintained under similar conditions which do not contain a stabilizer. They undergo no appreciable decomposition at ordinary temperatures, while their value for the purpose of inflating rubber balls or the like at such temperatures as are customary in the art, e. g., 100° C. or over, is not diminished.

As many apparently widely different embodiments of this invention may be made without departing from the spirit and scope thereof, it is to be understood that I do not limit myself to the specific embodiments thereof except as defined in the following claims.

I claim:

1. Solid gas-producing compositions which evolve gas under the action of heat, in a form suitable for insertion within hollow inflatable articles, said compositions comprising a mixture of ammonium salt and an alkali metal nitrite capable of liberating a required quantity of gas on heating to an elevated temperature without the addition of a foreign reactant, and containing as a stabilizer an inert dehydrating salt.

2. Solid gas-producing compositions which evolve gas under the action of heat, in pelleted form suitable for insertion within hollow inflatable articles, said compositions comprising a mixture of an ammonium salt and an alkali metal nitrite capable of liberating a required quantity of gas on heating to an elevated temperature without the addition of a foreign reactant, and containing as a stabilizer an anhydrous substance capable of forming a hydrate stable at any temperature at which the pellet is required to remain without decomposition.

3. Solid gas-producing compositions which evolve gas under the action of heat, in pelleted form suitable for insertion within hollow inflatable articles, said compositions comprising a mixture of ammonium salt and an alkali metal nitrite capable of liberating a required quantity of gas on heating to an elevated temperature without the addition of a foreign reactant, and containing as a stabilizer a lower hydrate which has a strong tendency to form a higher hydrate at any temperature at which the pellet is required to remain without decomposition.

4. Solid gas-producing compositions comprising a mixture of ammonium chloride and an alkali metal nitrite capable of liberating a required quantity of gas at an elevated temperature and containing as a stabilizer an inert dehydrating salt.

5. Gas-producing compositions which comprise a mixture of an ammonium salt and an alkali metal nitrite capable of liberating a required quantity of gas at an elevated temperature and a stabilizer consisting of anhydrous sodium carbonate.

6. Gas-producing compositions which comprise a mixture of an ammonium salt and an alkali metal nitrite capable of liberating a required quantity of gas at an elevated temperature and a stabilizer consisting of anhydrous sodium sulfate.

7. Gas-producing compositions containing a mixture of ammonium chloride and sodium nitrite together with anhydrous sodium carbonate as a stabilizer.

8. Gas-producing compositions as claimed in claim 7 in which between 0.5% and 5.0% of stabilizer is employed.

9. Gas-producing compositions as claimed in claim 7 in which about 1.0% to about 2.0% of stabilizer is employed.

10. A stabilized gas-producing composition comprising substantially a pelleted mixture of about 40.0% ammonium chloride, about 59.0% sodium nitrite, and about 1.0% anhydrous sodium carbonate.

WILFRED RODNEY COUSINS.